United States Patent
Tansey (10) Patent No.: US 7,283,251 B1
(45) Date of Patent: Oct. 16, 2007

(54) BLACK FRINGE WAVEFRONT SENSOR

(75) Inventor: Richard J. Tansey, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 140 days.

(21) Appl. No.: 11/258,219

(22) Filed: Oct. 26, 2005

(51) Int. Cl.
*G01B 9/02* (2006.01)

(52) U.S. Cl. .................................................. 356/512

(58) Field of Classification Search ................ 356/489, 356/495, 511–515
See application file for complete search history.

(56) References Cited

U.S. PATENT DOCUMENTS

| | | | |
|---|---|---|---|
| 4,575,247 A | | 3/1986 | Tansey |
| 4,645,346 A | * | 2/1987 | Fontanella .................... 356/520 |
| 4,707,135 A | | 11/1987 | Swain et al. |
| 4,935,614 A | * | 6/1990 | Hubbard et al. ............. 356/520 |
| 5,050,993 A | | 9/1991 | Tansey |
| 5,133,601 A | | 7/1992 | Cohen et al. |
| 6,813,069 B2 | | 11/2004 | Rice et al. |
| 6,902,281 B2 | * | 6/2005 | Bennett et al. ............... 359/846 |

OTHER PUBLICATIONS

Schrader, Implementation of an actively controlled white light interferometer for measurement of sub-wavelength structural distances, SPIE, vol. 3430, Jul. 1998, pp. 293-303.*

\* cited by examiner

*Primary Examiner*—Samuel A. Turner
(74) *Attorney, Agent, or Firm*—McDermott Will & Emery LLP (57) ABSTRACT

A method of performing closed loop correction of phase aberrations, including the steps of directing an incoming light beam into a black fringe wavefront sensor via an adaptive optical device ("AOD"), dividing the incoming light beam into measurement and reference beams, altering the path length of the measurement beam and the location of the black fringe by modulating a ramp voltage of a modulator, combining the measurement and reference beams into a common output beam, detecting the black fringe in the common output beam using detectors mapped to the AOD, storing, as tagged ramp voltages, a corresponding ramp voltage for each detector when it detects black fringe, calculating phase errors based upon the tagged ramp voltages and modulator scaling, calculating adaptive optics correction voltages based upon the phase errors, transmitting and applying the correction voltages to the AOD to correct phase aberrations of the incoming light beam via phase conjugation.

34 Claims, 5 Drawing Sheets

BLACK FRINGE WAVEFRONT SENSOR

STATEMENT REGARDING FEDERALLY SPONSORED RESEARCH OR DEVELOPMENT

Not applicable.

FIELD OF THE INVENTION

The present invention generally relates to wavefront sensors and, in particular, relates to the closed loop correction of phase aberrations using a black fringe wavefront sensor.

BACKGROUND OF THE INVENTION

There exists a need for adaptive optics systems which can correct for light distortions which occur in the medium of transmission. Conventional adaptive optics ("AO") systems measure the characteristics of a lens, and correct for distortions using a computer-controlled deformable mirror, where the device which measures the distortions in the incoming wavefront of light is known as a wavefront sensor.

Figure 1:
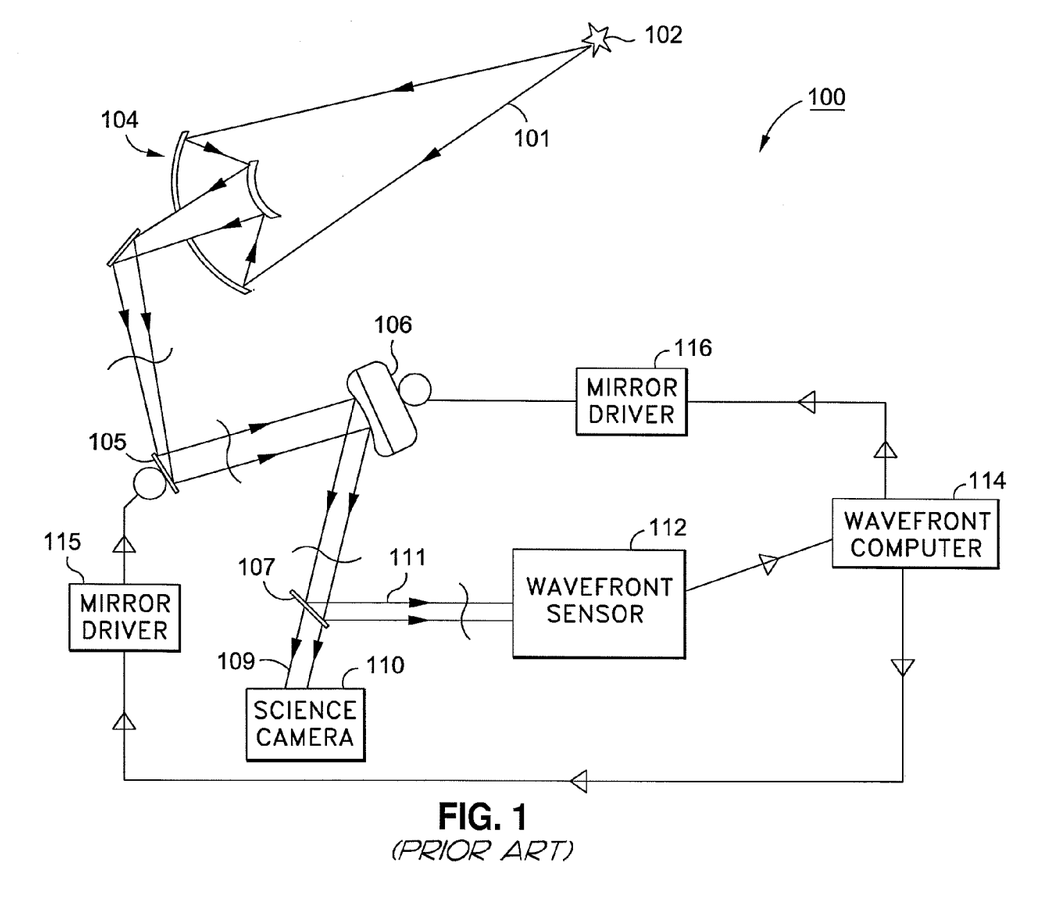
FIG. 1 depicts one example of a conventional closed loop AO system which is commonly used in the astronomical community.

FIG. 1 depicts conventional AO system 100, which is an example of a closed loop AO system commonly used in the astronomical community. Light beam 101 emanating from nominal point source 102, a star, is directed through reflective and refractive elements within telescope 104, toward fast steering mirror 105. Fast steering mirror 105 directs light beam 101 into deformable mirror 106 and the wavefront sensor 112, where wavefront errors are corrected, as described more fully below.

Light beam 101 enters beam splitter 107, where it is split into two beams. Beam 109 enters science camera 110, where the light beam is viewed by the user of conventional AO system 100. Light beam 111 is directed into Shack-Hartmann wavefront sensor 112, which measures phase errors representing the derivative or slope of the wavefront in order to correct beam train or path length aberrations. These errors are communicated to wavefront computer 114, which calculates a reconstruction matrix to determine the phase or integral of the slope and passes these values as correction voltages to be applied to fast steering mirror 105 as X/Y tip/tilt values to stabilize the image, and phase values $\Phi_{ij}$ (representing the phase values of an array of i,j pixels) to the deformable mirror 106, which restores the image sharpness lost to atmospheric turbulence. Wavefront computer 114 transmits these X/Y tip/tilt and $\Phi_{ij}$ phase correction voltages to mirror drivers 115 and 116. Mirror drivers 115 and 116 apply the correction voltages to fast steering mirror 105 and deformable mirror 106, respectively, which apply the X/Y tip/tilt correction and $\Phi_{ij}$ phase correction to the incoming wavefront from the target or star 102.

Figure 2:
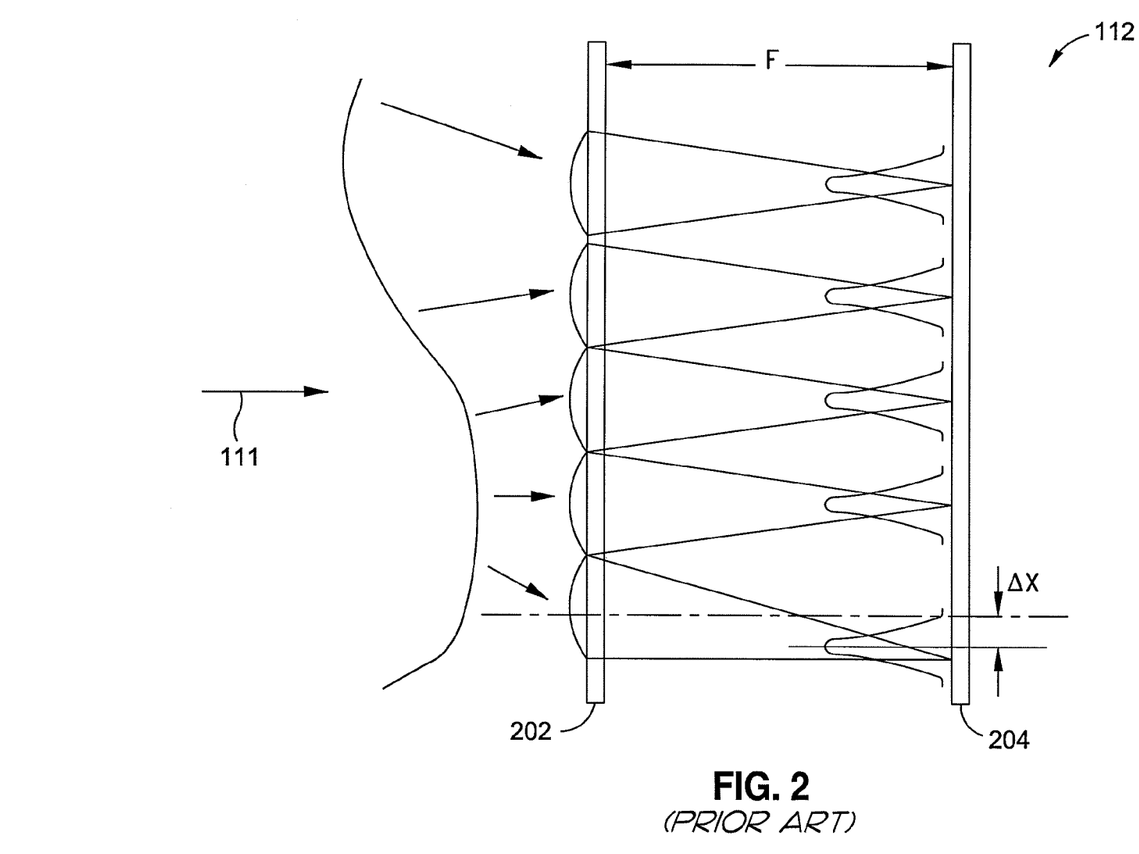
FIG. 2 depicts one approach to wavefront sensing, using a Shack-Hartmann wavefront sensor.

FIG. 2 depicts the wavefront sensing technique used by Shack-Hartmann wavefront sensor 112. As shown, this approach is completely geometric in nature, and has no dependence on the coherence of the sensed optical beam. The wavefront of light beam 111 is broken into an array of spatial samples, called subapertures of the primary aperture, by two dimensional array of lenslets 202. The subaperture sampled by each lenslet is brought to a focus at a known distance F behind each array, on two-dimensional detector array 204. The lateral position of the focal spot depends on the local tilt of the incoming wavefront. The location of all the subaperture spot positions and corresponding spot deviations ΔX and ΔY are used to measure the gradient of the incoming wavefront. A two-dimensional integration process, known as 'reconstruction,' is then used to estimate the shape of the original wavefront, and thus derive the correction signals for the deformable mirror.

To its disadvantage, however, conventional Shack-Hartmann AO sensor 112 requires massive reconstructors, and the sensor is not highly scalable. Other conventional methods, such as heterodyne direct phase methods or active imaging, have high laser power requirements, or have a high minimum pixel count. Accordingly, it is desirable to provide for wavefront sensing which overcomes the deficiencies of conventional approaches. In particular, it is desirable to provide for the closed loop correction of phase aberrations, using a black fringe wavefront sensor, to avoid the use of a reconstructor.

BRIEF SUMMARY OF THE INVENTION

The present invention generally relates to wavefront sensors and, in particular, relates to the closed loop correction of phase aberrations using a black fringe wavefront sensor.

In general, the present invention bases wavefront measurements on a white light interference pattern, using a street lamp or a star, for example, as a source or beacon. Using white light, the position of the black fringe is detected by sensing intensity changes at an array of detectors, where a black fringe null triggers a sample and hold of a lead-zirconate-titanate ("PZT") driven scanning mirror. The sampled scan mirror voltage is simultaneously obtained at the point of the black fringe minimum intensity by a pixel or detector. Note that the 'white fringe' or maximum intensity of the white light interference pattern could also be used. The key criteria is that the black fringe location or white fringe location identifies the zero optical path difference ("OPD") position.

According to one arrangement, the present invention is a method of performing closed loop correction of phase aberrations. The method includes the steps of directing an incoming light beam into a black fringe wavefront sensor via an interferometer, dividing the incoming light beam into a measurement beam and a reference beam using at least one of a plurality of optical elements, and altering the path length of the measurement beam and the location of black fringe by modulating a ramp voltage of a modulator affixed to at least one of the plurality of optical elements. The method also includes the steps of combining the measurement beam and the reference beam into a common output beam using at least one of the plurality of optical elements, detecting black fringe in the common output beam using a plurality of detectors mapped to the adaptive optical device, storing, as tagged ramp voltages, a corresponding ramp voltage for each of the plurality of detectors upon detecting black fringe by each of the plurality of detectors, and calculating phase errors based upon the tagged ramp voltages and modulator scaling. Furthermore, the method includes the steps of calculating a plurality of adaptive optics correction voltages based upon the phase errors, transmitting the adaptive optics correction voltages to the adaptive optical device, and applying the adaptive optics correction voltages to the adaptive optical device to correct phase aberrations of the incoming light beam via phase conjugation.

According to a second arrangement, the present invention is a system for performing closed loop correction of phase aberrations. The system includes an adaptive optical device and a black fringe wavefront sensor. The black fringe wavefront sensor further includes a plurality of optical elements, the plurality of optical elements dividing an incoming light beam into a measurement beam and a reference beam, and combining the measurement beam and the reference beam into a common output beam. The plurality of optical elements includes a test mirror. The black fringe wavefront sensor further includes a modulator affixed to the test mirror, the modulator modulating based upon a ramp voltage, thereby altering optical path length of the measurement beam and location of black fringe, and a plurality of detectors mapped to the adaptive optical device, for detecting black fringe in the common output beam. The black fringe wavefront sensor further includes a controller, the controller storing, as tagged ramp voltages, a corresponding ramp voltage for each of the plurality of detectors upon detecting black fringe by each of the plurality of detectors, calculating phase errors based upon the tagged ramp voltages and modulator scaling, calculating a plurality of adaptive optics correction voltages based upon the phase errors, and transmitting the adaptive optics correction voltages to the adaptive optical device. The incoming light beam is directed into the black fringe wavefront sensor via the adaptive optical device. The adaptive optics correction voltages are applied to the adaptive optical device, correcting phase aberrations of the incoming light beam via phase conjugation.

According to a third arrangement, the present invention is a black fringe wavefront sensor apparatus, including a plurality of optical elements, the plurality of optical elements dividing an incoming light beam into a measurement beam and a reference beam, and combining the measurement beam and the reference beam into a common output beam. The plurality of optical elements includes a test mirror. The black fringe wavefront sensor apparatus also includes a modulator affixed to the test mirror, the modulator modulating based upon a ramp voltage, thereby altering optical path length of the measurement beam and location of black fringe. The black fringe wavefront sensor apparatus further includes a plurality of detectors for detecting black fringe in the common output beam, and a controller, the controller storing, as tagged ramp voltages, a corresponding ramp voltage for each of the plurality of detectors upon detecting black fringe by each of the plurality of detectors, and calculating phase errors based upon the tagged ramp voltages and modulator scaling.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE SEVERAL VIEWS OF THE DRAWINGS

Referring now to the drawings in which like reference numbers represent corresponding parts throughout.

DETAILED DESCRIPTION OF THE INVENTION

The present invention provides for the closed loop correction of phase aberrations using a black fringe wavefront sensor, to avoid the use of a reconstructor.

Figure 3:
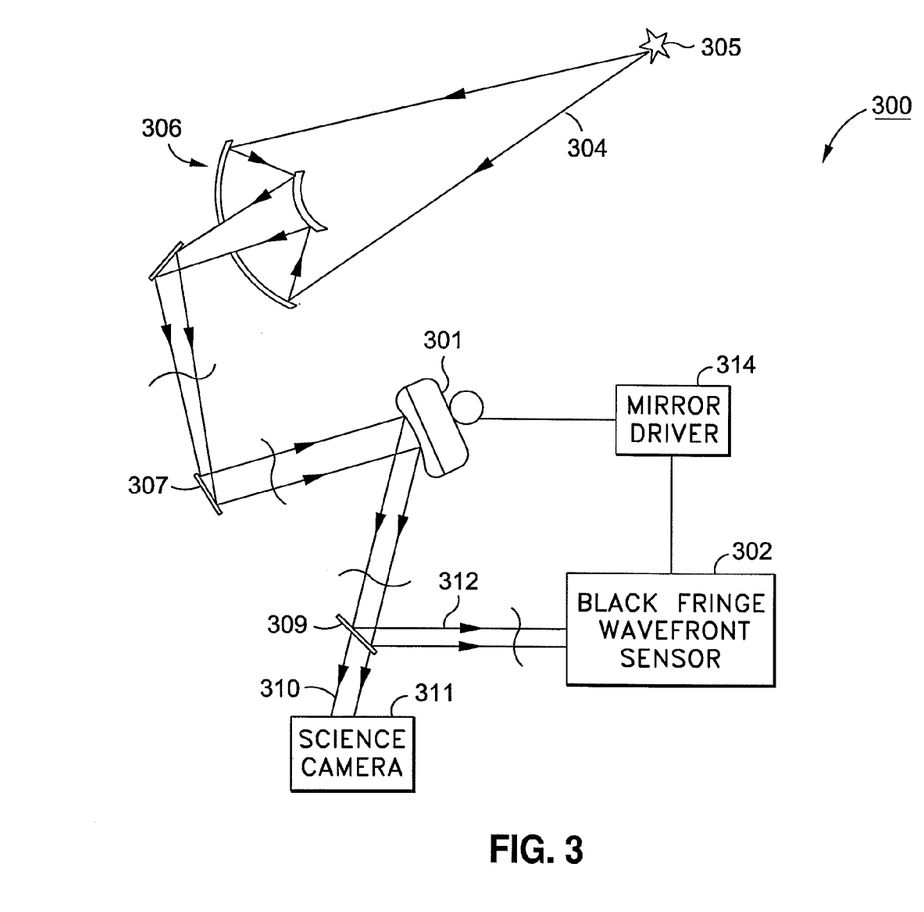
FIG. 3 depicts a system for performing closed loop correction of phase aberrations according to one example embodiment of the present invention.

FIG. 3 depicts a system for performing closed loop correction of phase aberrations according to one example embodiment of the present invention. Briefly, the system includes an adaptive optical device and a black fringe wavefront sensor. The black fringe wavefront sensor further includes a plurality of optical elements, the plurality of optical elements dividing an incoming light beam into a measurement beam and a reference beam, and combining the measurement beam and the reference beam into a common output beam. The plurality of optical elements includes a test mirror. The black fringe wavefront sensor further includes a modulator affixed to the test mirror, the modulator modulating based upon a ramp voltage, thereby altering optical path length of the measurement beam and location of black fringe, and a plurality of detectors mapped to the adaptive optical device, for detecting black fringe in the common output beam. The black fringe wavefront sensor further includes a controller, the controller storing, as tagged ramp voltages, a corresponding ramp voltage for each of the plurality of detectors upon detecting black fringe by each of the plurality of detectors, calculating phase errors based upon the tagged ramp voltages and modulator scaling, calculating a plurality of adaptive optics correction voltages based upon the phase errors, and transmitting the adaptive optics correction voltages to the adaptive optical device. The incoming light beam is directed into the black fringe wavefront sensor via the adaptive optical device. The adaptive optics correction voltages are applied to the adaptive optical device, correcting phase aberrations of the incoming light beam via phase conjugation.

The present invention bases wavefront measurements on a white light interference pattern, using a street lamp or a star, for example, as a source or beacon. Using an interferometer, the position of black fringe is detected by sensing intensity changes at an array of detectors, where black fringe null or white light maximum triggers a sample and hold of an actuator modulation signal. Using the sampled actuator modulation signals, phase correction signals and corresponding negative voltages are calculated for an adaptive optical device, where the adaptive optical device is configured to apply these correction voltages to correct phase aberrations, using phase conjugation In more detail, system 300 for performing closed loop correction of phase aberrations includes adaptive optical device 301 and black fringe wavefront sensor 302. Black fringe wavefront sensor 302 further includes a plurality of optical elements. Black fringe wavefront sensor 302 is configured to measure the visibility envelope from broadband lasers or white light.

Figure 4:
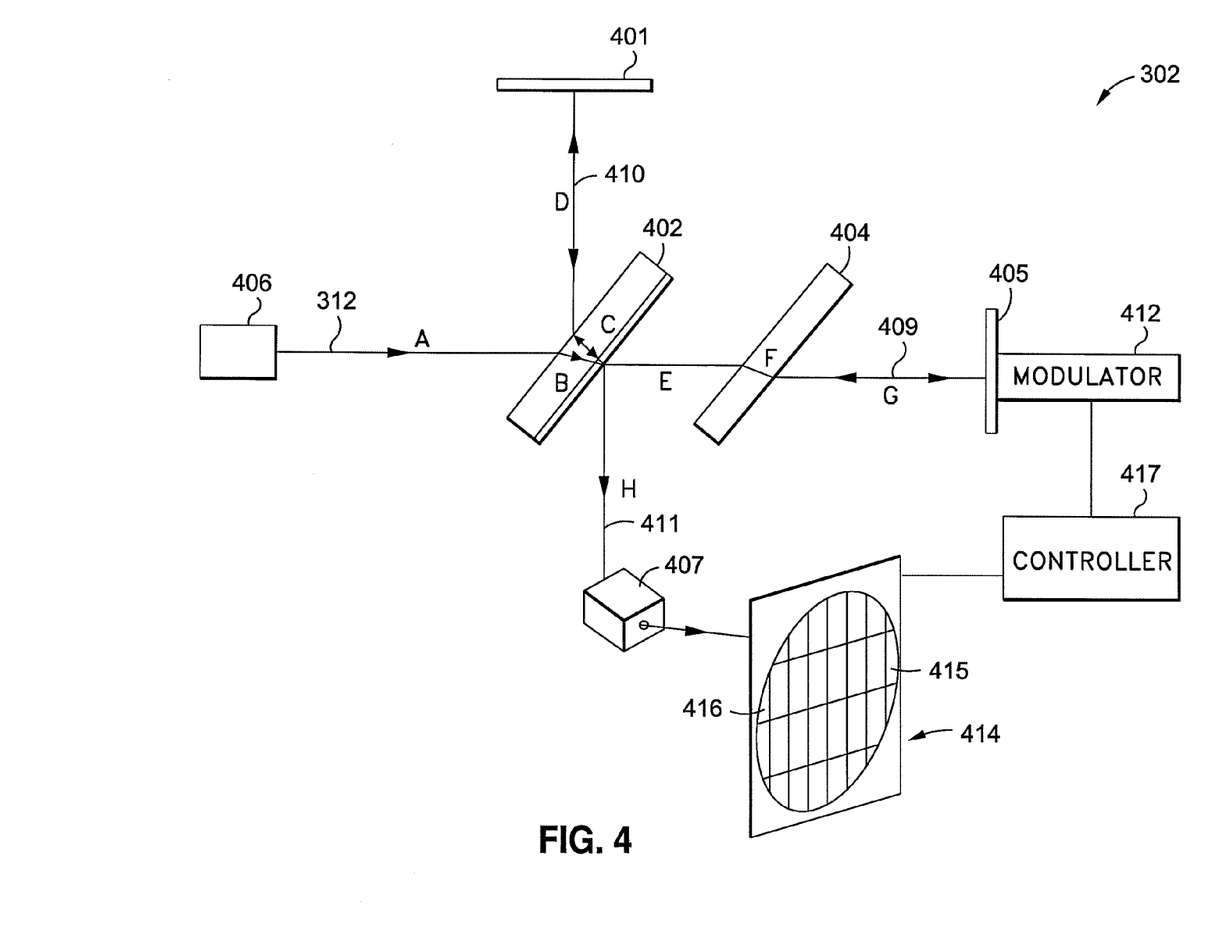
FIG. 4 depicts the black fringe wavefront sensor according to one aspect of the present invention, in the case where the plurality of optical elements comprise a Michelson interferometer.

FIG. 4 depicts the black fringe wavefront sensor 302 according to one aspect of the present invention, in the case where the plurality of optical elements comprise a Michelson interferometer. In alternate embodiments, the plurality of optical elements may comprise another interferometer configuration, such as a point diffraction interferometer, a Mach-Zehnder interferometer, or a Sagnac interferometer configured as a radial shear interferometer. In this example embodiment, the plurality of optical elements includes reference mirror 401, beam splitter 402, compensator plate 404, test mirror 405, collimation lens 406, and focusing lens 407.

The plurality of optical elements divide incoming light beam 312, which travels unidirectionally along common segment A-B, into measurement beam 409 and reference beam 410. Measurement beam 409 travels bidirectionally along segment E-F-G, and reference beam 410 travels bidirectionally along segment C-D. The plurality of optical elements combine measurement beam 409 and reference beam 410 into common output beam 411, which travels unidirectionally along common segment H.

Compensator plate 404 is inserted in the path of measurement beam 409 between beam splitter 402 and test mirror 405 in order to compensate for the path length of segment C of reference beam 410 within beam splitter 402. When the path length of segment D is identical to the combined path lengths of segments E and G, the result is zero optical path difference, producing black fringe.

Black fringe wavefront sensor 302 further includes modulator 412 affixed to test mirror 405, modulator 412 modulating based upon a ramp voltage, thereby altering optical path length of the measurement beam 409 (represented by a round trip of segment E-F-G) and location of black fringe. Black fringe wavefront sensor 302 includes plurality of detectors 414, including detectors 415 and 416, which are mapped to adaptive optical device 301, for detecting black fringe in common output beam 411. Using black fringe wavefront sensor 302, the zero OPD position can be determined using the location of black fringe 'null,' or the location of maximum visibility 'max' (or white fringe point) of reference pattern, zero OPD existing where the path length of the measurement beam and reference beam are exactly the same.

By modulating modulator 412, the plurality of detectors 414 scan for black fringe, resulting in a voltage measurement or time versus black fringe position measurement for each of the detectors. If each of the plurality of detectors 414 are placed at an arbitrary position in an exit aperture of black fringe wavefront sensor 302, a 'peak' or minimum signal is detected when black fringe or the minimum/maximum of the visibility function are scanned past each detector. Since black fringe occurs where the OPD is zero, the ramp voltage of modulator 412 is stored for use in calculating correction voltages.

Each of the plurality of detectors 414 will in most instances have a different corresponding tagged ramp voltage, since the tagged voltage depends upon when the black fringe crosses the individual detector. The presence of black fringe at the detector will unambiguously determine the value of the OPD or piston phase at that point, without any 2π errors.

Black fringe wavefront sensor 302 further includes controller 417, controller 417 storing, as tagged ramp voltages, a corresponding ramp voltage for each of plurality of detectors 414 upon detecting black fringe by each of plurality of detectors 414. Controller 417 stores the corresponding ramp voltages using a sample and hold circuit. Controller 417 also calculates phase errors based upon the tagged ramp voltages and modulator scaling, calculates a plurality of adaptive optics correction voltages based upon the phase errors, and transmits the adaptive optics correction voltages to adaptive optical device 301.

By previous calibration and observation of the fringe separation or known movement of modulator 412, modulator scaling is calibrated to X volts per wave. If each of plurality of detectors 414 is imaged 1:1 with adaptive optical device 301, then the voltage scaling is a direct measurement of the phase error. For example, if the scan is 2 volts per wave and the black fringe is sensed by one of plurality of detectors 414 at 0.5 volts, the phase is calculated as 0.25 waves.

The negative of the calibrated voltage is sent to adaptive optical device 301, which cancels existing phase aberrations, by phase conjugation. A simple first order servo can be used to transmit the instantaneous correction voltages to adaptive optical device 301 to correct the phase.

Returning now to FIG. 3, incoming light beam 304 is directed into black fringe wavefront sensor 302 via adaptive optical device 301. Adaptive optics correction voltages are applied to adaptive optical device 301, correcting phase aberrations of incoming light 304 via phase conjugation, where phase conjugation principles are well known in the art.

In one aspect, adaptive optical device 301 is a deformable mirror or a micro electro-mechanical system ("MEMS") mirror, although in alternate aspects, other adaptive optical devices are used. Phase aberrations of the incoming light are corrected in real time or near real time. In one aspect, modulator 412 is a PZT actuator, although in alternate aspects, another type of modulator or actuator, such as an acousto-optic modulator, an electro-optic modulator, or a fiber-optic phase modulator, is used.

In one aspect, the plurality of optical elements within black fringe wavefront sensor 302 comprise a Michelson interferometer. In alternate aspects, however, another interferometer configuration, such as a point diffraction interferometer, a Mach-Zehnder interferometer, or a Sagnac interferometer configured as a radial shear interferometer, is used.

In one aspect, plurality of detectors 414 comprises a charge-coupled device ("CCD"), although in alternate aspects, another detector configuration, such as a focal plane array ("FPA") pixel detector, or another detector configuration, where each of the plurality of detectors are configured to sense intensity changes of the output beam, is used.

The operation of system 300 is now described, in further detail. Light beam 304 emanating from nominal point source 305, which is a star in this embodiment, is directed through reflective and refractive elements within telescope 306, toward fast steering mirror 307. Fast steering mirror 307 directs light beam 304 into adaptive optical device 301, where wavefront errors are corrected, as described above. Light beam 304 enters beam splitter 309, where it is split into two beams. Light beam 310 enters science camera 311, where light beam 310 is viewed by the user of system 300. Light beam 312 is directed into black fringe wavefront sensor 302, which measures phase errors and beam train or path length aberrations. Black fringe wavefront sensor 302 calculates a plurality of adaptive optics correction voltages based upon detected phase errors, and transmits the adaptive optics correction voltages to adaptive optical device 301, via mirror driver 314. Adaptive optical device 301 applies the phasing and beam path corrections to incoming light beam 304.

With the embodiment described above, it is the peak or location of the maximum intensity fringe, next to the black fringe, which is used to determine the absolute position of zero OPD for the system. By using a modulator or other translation device attached to a mirror in the measurement beam path of the black fringe wavefront sensor, the white or black fringe is translated across the aperture and subsequently across a suitably located detector arranged at a 1:1 conjugate position with respect to an actuator which controls an adaptive optical device.

The timing of black fringe across the detector is used to establish a reference clock to locate the zero OPD phase location. Using this reference point of the mirror scan, black fringe minimum or white fringe maximum locations are scanned for each detector and its conjugate located actuator. Due to phase aberrations in the system, either external or internal, these times for the location of the black fringe with respect to the mirror scan will oftentimes be different for each actuator due to the particular phase error causing the OPD difference.

Using a comparator circuit, which operates similar to a phase-to-voltage converter used in conventional heterodyne interferometry, the measured time for each black fringe location is converted to a voltage, where the voltage is used to drive the adaptive optical device to a location which minimizes the OPD.

Figure 5:
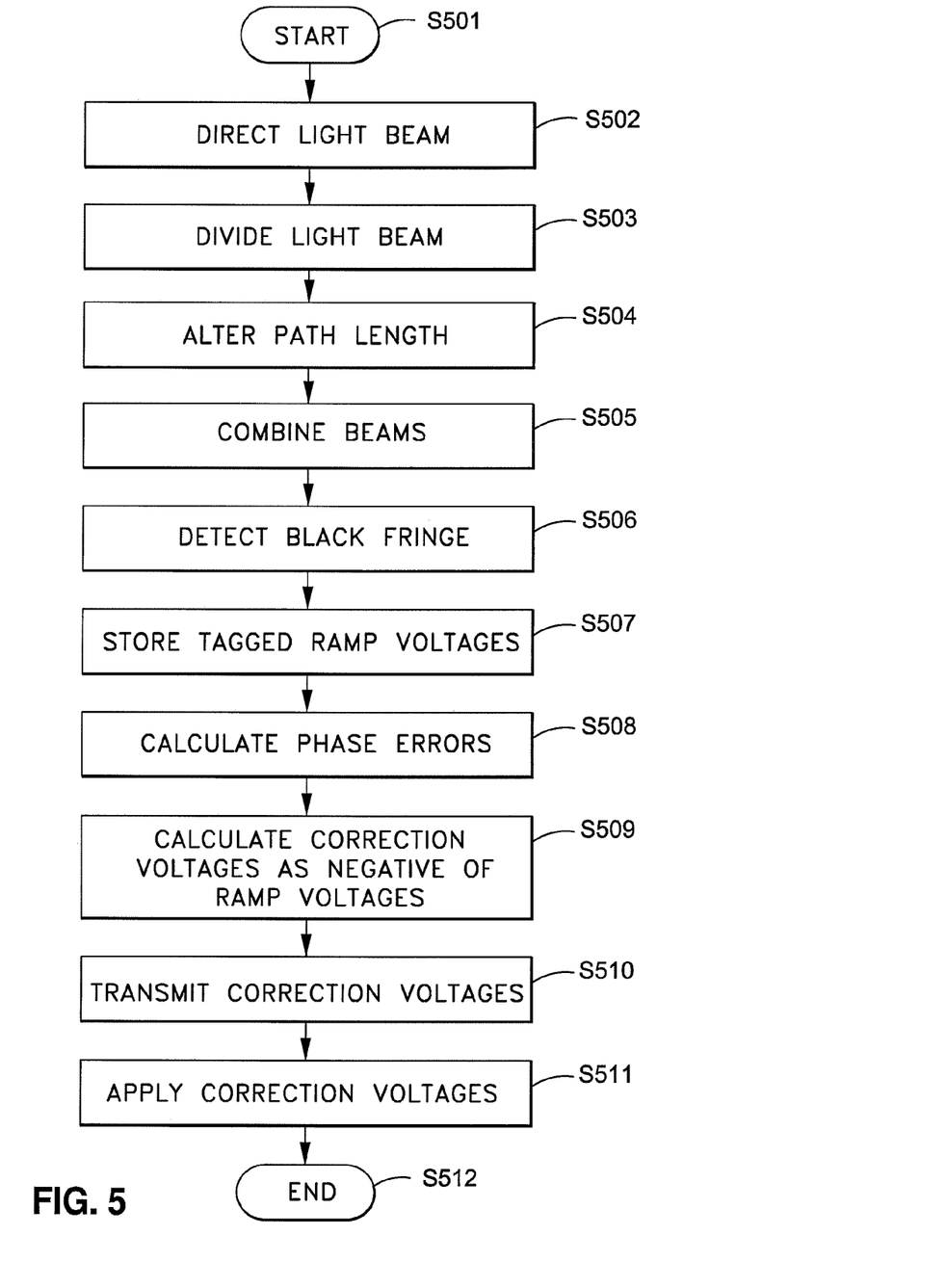
FIG. 5 is a flowchart depicting a method of performing closed loop correction of phase aberrations, according to a second example embodiment of the present invention.

FIG. 5 depicts a method of performing closed loop correction of phase aberrations, according to a second arrangement of the present invention. Briefly, the method includes the steps of directing an incoming light beam into black fringe wavefront sensor via an adaptive optical device, dividing the incoming light beam into a measurement beam and a reference beam using at least one of a plurality of optical elements, and altering the path length of the measurement beam and the location of black fringe by modulating a ramp voltage of a modulator affixed to at least one of the plurality of optical elements. The method also includes the steps of combining the measurement beam and the reference beam into a common output beam using at least one of the plurality of optical elements, detecting black fringe in the common output beam using a plurality of detectors mapped to the adaptive optical device, storing, as tagged ramp voltages, a corresponding ramp voltage for each of the plurality of detectors upon detecting black fringe by each of the plurality of detectors, and calculating phase errors based upon the tagged ramp voltages and modulator scaling. Furthermore, the method includes the steps of calculating a plurality of adaptive optics correction voltages based upon the phase errors, transmitting the adaptive optics correction voltages to the adaptive optical device, and applying the adaptive optics correction voltages to the adaptive optical device to correct phase aberrations of the incoming light beam via phase conjugation.

Wavefront measurements are calculated using white light interference patterns, where the source of the white light can be a street lamp or a star, for example. By sensing intensity changes using an array of detectors, the position of black fringe is detected, where black fringe null triggers a sample and hold of actuator modulation signals. Phase correction signals and corresponding correction voltages for an adaptive optical device are calculated using the sampled actuator modulation signals. The adaptive optical device applies the correction voltages, and the phase aberrations are corrected via phase conjugation.

In more detail, the process begins (step S501), and an incoming light beam is directed into a black fringe wavefront sensor via an adaptive optical device (step S502). The black fringe wavefront sensor is used to achieve limited white light fringe visibility from a variety of sources, such as a broadband lasers, white light, or multiple lasers operating at different wavelengths. The incoming light beam is divided into a measurement beam and a reference beam using at least one of a plurality of optical elements (step S503).

The path length of the measurement beam and the location of black fringe are altered by modulating a ramp voltage of a modulator affixed to at least one of the plurality of optical elements (step S504). The measurement beam and the reference beam are combined into a common output beam using at least one of the plurality of optical elements (step S505).

Black fringe is detected in the common output beam using a plurality of detectors mapped to the adaptive optical device (step S506). Each of the plurality of detectors produce traces of white light fringes, demarcating visibility. At the peak of visibility, the ramp voltage input to the modulator is scanned, where zero OPD is determined based upon the location of black fringe, or the maximum visibility function of a reference pattern. When placed at an arbitrary position in the exit aperture of the black fringe wavefront sensor, a plurality of detectors detect a peak or minimum signal when black fringe is scanned past each detector, or when the minimum/maximum of the visibility function occurs.

A corresponding ramp voltage is stored, as a tagged ramp voltage, for each of the plurality of detectors upon detecting black fringe by each of the plurality of detectors (step S507). The modulation ramp voltage is synchronously detected with the intensity detection by the plurality of detectors. The ramp voltage of the modulator is stored in a sample and hold circuit, for later calculation of correction voltages, since black fringe occurs when OPD is zero.

The ramp voltages are stored until the next null is sensed. Alternatively, the modulator ramp voltages are sampled only at the null trigger. In this regard, the trigger is similar to a zero-crossing phase detector, however the null trigger provides an unambiguous phase when referenced to the modulator ramp voltage, with no $2\pi$ error. Accordingly, there is no need for a phase-to-voltage detector and reference signal.

Phase errors are calculated based upon the tagged ramp voltages and modulator scaling, since each of the detectors is likely to have a different corresponding tagged ramp voltage (step S508). The presence of black fringe at the detector will unambiguously determine the value of the OPD or piston phase at that point, without any $2\pi$ errors.

A plurality of adaptive optics correction voltages are calculated, based upon the phase errors (step S509). By previous calibration and observation of the fringe separation or known movement of the modulator, modulator scaling is calibrated to X volts per wave. If each of the plurality of detectors is imaged 1:1 with adaptive optical device, then the voltage scaling is a direct measurement of the phase error. For example, if the scan is 2 volts per wave and the black fringe is sensed by one of the plurality of detectors at 0.5 volts, the phase is calculated at 0.25 waves.

The negative of the calibrated voltage is transmitted to the adaptive optical device to cancel existing phase aberrations by phase conjugation (step S510). A simple first order servo can be used to transmit the instantaneous correction voltages to adaptive optical device to correct the phase. The adaptive optics correction voltages are applied to the adaptive optical device to correct phase aberrations of the incoming light beam via phase conjugation (step S511), and the process ends (step S512). The actuators controlling the adaptive optical system are controlled by the black fringe wavefront sensor to maintain the best fit wavefront and minimum point spread function at the focal plane.

According to a third arrangement, the present invention is a black fringe wavefront sensor apparatus, including a plurality of optical elements, the plurality of optical elements dividing an incoming light beam into a measurement beam and a reference beam, and combining the measurement beam and the reference beam into a common output beam. The plurality of optical elements includes a test mirror. The black fringe wavefront sensor apparatus also includes a modulator affixed to the test mirror, the modulator modulating based upon a ramp voltage, thereby altering optical path length of the measurement beam and location of black fringe. The black fringe wavefront sensor apparatus further includes a plurality of detectors for detecting black fringe in the common output beam, and a controller, the controller storing, as tagged ramp voltages, a corresponding ramp voltage for each of the plurality of detectors upon detecting black fringe by each of the plurality of detectors, and calculating phase errors based upon the tagged ramp voltages and modulator scaling.

Other implementations or embodiments are also possible in order to use the underlying concept of the present invention to correct phase errors in telescopes or lasers, in order to correct image distortions. Other example uses include optical testing, laser diagnostics, and non-destructive industrial or mechanical testing. The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of performing closed loop correction of phase aberrations, comprising the steps of:
   directing an incoming light beam into a black fringe wavefront sensor via an adaptive optical device;
   dividing the incoming light beam into a measurement beam and a reference beam using at least one of a plurality of optical elements;
   altering the path length of the measurement beam and the location of black fringe by modulating a ramp voltage of a modulator affixed to at least one of the plurality of optical elements;
   combining the measurement beam and the reference beam into a common output beam using at least one of the plurality of optical elements;
   detecting black fringe in the common output beam using a plurality of detectors mapped to the adaptive optical device;
   storing, as tagged ramp voltages, a corresponding ramp voltage for each of the plurality of detectors upon detecting black fringe by each of the plurality of detectors;
   calculating phase errors based upon the tagged ramp voltages and modulator scaling;
   calculating a plurality of adaptive optics correction voltages based upon the phase errors;
   transmitting the adaptive optics correction voltages to the adaptive optical device; and
   applying the adaptive optics correction voltages to the adaptive optical device to correct phase aberrations of the incoming light beam via phase conjugation.

2. A system for performing closed loop correction of phase aberrations, comprising:
   an adaptive optical device; and
   a black fringe wavefront sensor, said black fringe wavefront sensor further comprising:
      a plurality of optical elements, said plurality of optical elements dividing an incoming light beam into a measurement beam and a reference beam, and combining the measurement beam and the reference beam into a common output beam, said plurality of optical elements comprising a test mirror,
      a modulator affixed to said test mirror, said modulator modulating based upon a ramp voltage, thereby altering optical path length of the measurement beam and location of black fringe,
      a plurality of detectors mapped to said adaptive optical device, for detecting black fringe in the common output beam, and
      a controller, said controller storing, as tagged ramp voltages, a corresponding ramp voltage for each of said plurality of detectors upon detecting black fringe by each of said plurality of detectors, calculating phase errors based upon the tagged ramp voltages and modulator scaling, calculating a plurality of adaptive optics correction voltages based upon the phase errors, and transmitting the adaptive optics correction voltages to said adaptive optical device,
   wherein the incoming light beam is directed into said black fringe wavefront sensor via the adaptive optical device, and
   wherein the adaptive optics correction voltages are applied to said adaptive optical device, correcting phase aberrations of the incoming light beam via phase conjugation.

3. The system according to claim 2, wherein said adaptive optical device is a deformable mirror.

4. The system according to claim 2, wherein said adaptive optical device is a micro electro-mechanical system ("MEMS") mirror.

5. The system according to claim 2, wherein phase aberrations of the incoming light are corrected in real time.

6. The system according to claim 2, wherein said modulator is a lead-zirconate-titanate ("PZT") actuator.

7. The system according to claim 2, wherein said modulator is an acousto-optic modulator.

8. The system according to claim 2, wherein said modulator is an electro-optic modulator.

9. The system according to claim 2, wherein said modulator is a fiber-optic phase modulator.

10. The system according to claim 2, wherein said plurality of optical elements further comprises a reference mirror.

11. The system according to claim 2, wherein said plurality of optical elements further comprises a beam splitter.

12. The system according to claim 2, wherein said plurality of optical elements further comprises a collimation lens.

13. The system according to claim 2, wherein said plurality of optical elements further comprises a focusing lens.

14. The system according to claim 2, wherein said plurality of optical elements further comprises a compensator plate.

15. The system according to claim 2, wherein said plurality of optical elements comprises a Michelson interferometer.

16. The system according to claim 2, wherein said plurality of optical elements comprises a Mach-Zehnder interferometer.

17. The system according to claim 2, wherein said plurality of optical elements comprises a Sagnac interferometer configured as a radial shear interferometer.

18. The system according to claim 2, wherein said plurality of detectors comprises a charge-coupled device ("CCD").

19. The system according to claim 2, wherein said plurality of detectors comprises a focal plane array ("FPA") pixel detector.

20. A black fringe wavefront sensor apparatus, comprising:
- a plurality of optical elements, said plurality of optical elements dividing an incoming light beam into a measurement beam and a reference beam, and combining the measurement beam and the reference beam into a common output beam, said plurality of optical elements comprising a test mirror;
- a modulator affixed to said test mirror, said modulator modulating based upon a ramp voltage, thereby altering optical path length of the measurement beam and location of black fringe;
- a plurality of detectors for detecting black fringe in the common output beam; and
- a controller, said controller storing, as tagged ramp voltages, a corresponding ramp voltage for each of said plurality of detectors upon detecting black fringe by each of said plurality of detectors, and calculating phase errors based upon the tagged ramp voltages and modulator scaling.

21. The black fringe wavefront sensor apparatus according to claim 20, wherein said modulator is a lead-zirconate-titanate ("PZT") actuator.

22. The black fringe wavefront sensor apparatus according to claim 20, wherein said modulator is an acousto-optic modulator.

23. The black fringe wavefront sensor apparatus according to claim 20, wherein said modulator is an electro-optic modulator.

24. The black fringe wavefront sensor apparatus according to claim 20, wherein said modulator is a fiber-optic phase modulator.

25. The black fringe wavefront sensor apparatus according to claim 20, wherein said plurality of optical elements further comprises a reference mirror.

26. The black fringe wavefront sensor apparatus according to claim 20, wherein said plurality of optical elements further comprises a beam splitter.

27. The black fringe wavefront sensor apparatus according to claim 20, wherein said plurality of optical elements further comprises a collimation lens.

28. The black fringe wavefront sensor apparatus according to claim 20, wherein said plurality of optical elements further comprises a focusing lens.

29. The black fringe wavefront sensor apparatus according to claim 20, wherein said plurality of optical elements further comprises a compensator plate.

30. The black fringe wavefront sensor apparatus according to claim 20, wherein said plurality of optical elements comprises a Michelson interferometer.

31. The black fringe wavefront sensor apparatus according to claim 20, wherein said plurality of optical elements comprises a Mach-Zehnder interferometer.

32. The black fringe wavefront sensor apparatus according to claim 20, wherein said plurality of optical elements comprises a Sagnac interferometer configured as a radial shear interferometer.

33. The black fringe wavefront sensor apparatus according to claim 20, wherein said plurality of detectors comprises a charge-coupled device ("CCD").

34. The black fringe wavefront sensor apparatus according to claim 20, wherein said plurality of detectors comprises a focal plane array ("FPA") pixel detector.

* * * * *